United States Patent
Khan

(10) Patent No.: US 11,115,727 B2
(45) Date of Patent: *Sep. 7, 2021

(54) SYSTEM AND METHOD FOR ADVERTISING

(71) Applicant: COMCAST CABLE COMMUNICATIONS, LLC, Philadelphia, PA (US)

(72) Inventor: Sohel Khan, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 535 days.

This patent is subject to a terminal disclaimer.

(21) Appl. No.: 14/453,242

(22) Filed: Aug. 6, 2014

(65) Prior Publication Data
US 2015/0033254 A1  Jan. 29, 2015

Related U.S. Application Data

(63) Continuation of application No. 13/445,695, filed on Apr. 12, 2012, now Pat. No. 8,843,956.

(51) Int. Cl.
*H04N 21/81* (2011.01)
*H04N 21/2668* (2011.01)
(Continued)

(52) U.S. Cl.
CPC ....... *H04N 21/812* (2013.01); *G06Q 30/0261* (2013.01); *G06Q 30/0264* (2013.01);
(Continued)

(58) Field of Classification Search
CPC .......... H04N 21/23424; H04N 21/262; H04N 21/26241; H04N 21/4316; H04N 21/458;
(Continued)

(56) References Cited

U.S. PATENT DOCUMENTS

| | | | |
|---|---|---|---|
| 5,774,170 | A | 6/1998 | Hite et al. |
| 7,228,555 | B2 | 6/2007 | Schlack |

(Continued)

FOREIGN PATENT DOCUMENTS

| | | |
|---|---|---|
| CA | 2812391 | 4/2013 |
| EP | 13163594.8 | 4/2013 |

OTHER PUBLICATIONS

European Search Report dated Mar. 20, 2014 by the European Patent office for EP Application No. 13163594.8, which was filed on Apr. 12, 2013 and published as U.S. Pat. No. 2,722,806 on Apr. 23, 2014 (Inventor-Sohel Khan; Applicant-Comcast Cable Communications, LLC) (6 pages).

(Continued)

*Primary Examiner* — Benjamin R Bruckart
*Assistant Examiner* — Tien M Nguyen
(74) *Attorney, Agent, or Firm* — Ballard Spahr LLP

(57) ABSTRACT

A system and method for advertising are disclosed. In an aspect, a method comprises rendering a content to a plurality of users, the content having a time duration, rendering a first selectable element associated with the content to a first one of the plurality of users at a first time during the time duration of the rendered content, and rendering a second selectable element associated with the content to a second one of the plurality of users at a second time during the time duration of the rendered content, wherein the second time is different from the first time and the first selectable element is not rendered to the first one of the plurality of users while the second selectable element is rendered to the second one of the plurality of users.

20 Claims, 9 Drawing Sheets

(51) Int. Cl.
| | |
|---|---|
| *G06Q 30/02* | (2012.01) |
| *H04N 21/858* | (2011.01) |
| *H04N 21/234* | (2011.01) |
| *H04N 21/63* | (2011.01) |
| *H04N 21/633* | (2011.01) |
| *H04N 21/235* | (2011.01) |
| *H04N 21/478* | (2011.01) |

(52) U.S. Cl.
CPC ..... *H04N 21/235* (2013.01); *H04N 21/23424* (2013.01); *H04N 21/2668* (2013.01); *H04N 21/478* (2013.01); *H04N 21/63* (2013.01); *H04N 21/633* (2013.01); *H04N 21/858* (2013.01)

(58) Field of Classification Search
CPC .. H04N 21/812; H04N 21/478; H04N 21/235; H04N 21/63; H04N 21/633; H04N 21/858; H04N 21/2668; H04N 21/26258; H04N 21/25841; H04N 21/25883; H04N 21/4307; H04N 21/4331; H04N 21/6125; H04N 21/64; H04N 21/6405; H04N 21/8456; G06Q 30/0261; G06Q 30/0264
See application file for complete search history.

(56) References Cited

U.S. PATENT DOCUMENTS

| | | | | |
|---|---|---|---|---|
| 2003/0084441 | A1* | 5/2003 | Hunt | H04N 5/782 725/32 |
| 2003/0130887 | A1* | 7/2003 | Nathaniel | G06Q 10/02 705/14.73 |
| 2004/0103189 | A1* | 5/2004 | Cherkasova | H04L 29/06027 709/224 |
| 2004/0194131 | A1* | 9/2004 | Ellis | H04N 5/44543 725/34 |
| 2004/0199635 | A1* | 10/2004 | Ta | H04L 12/5695 709/226 |
| 2006/0277574 | A1 | 12/2006 | Schein et al. | |
| 2007/0112656 | A1 | 5/2007 | Howe et al. | |
| 2007/0213010 | A1* | 9/2007 | Konchitsky | H04B 1/1027 455/63.1 |
| 2007/0291747 | A1 | 12/2007 | Stern et al. | |
| 2007/0294354 | A1 | 12/2007 | Sylvain | |
| 2008/0060000 | A1 | 3/2008 | Drouet et al. | |
| 2008/0109307 | A1* | 5/2008 | Ullah | G06Q 30/02 705/14.66 |
| 2008/0152113 | A1 | 6/2008 | Chang et al. | |
| 2009/0112681 | A1 | 4/2009 | Krishnan et al. | |
| 2010/0057485 | A1 | 3/2010 | Luft | |
| 2010/0153990 | A1 | 6/2010 | Ress et al. | |
| 2011/0053567 | A1 | 3/2011 | Ure | |
| 2011/0150208 | A1* | 6/2011 | Stearns | H04M 3/5158 379/266.07 |
| 2011/0212704 | A1 | 9/2011 | Preiss et al. | |
| 2011/0258214 | A1* | 10/2011 | Shu | H04L 41/0893 707/769 |

OTHER PUBLICATIONS

U.S. Appl. No. 13/445,695 (U.S. Pat. No. 8,843,956), filed Apr. 12, 2012 (Sep. 23, 2014), Sohel Khan.

* cited by examiner

SYSTEM AND METHOD FOR ADVERTISING

CROSS REFERENCE TO RELATED APPLICATION

This application is a Continuation of U.S. Non-Provisional application Ser. No. 13/445,695 filed Apr. 12, 2012, herein incorporated by reference in its entirety.

BACKGROUND

Current click-to-connect (C2C) and other two-way advertisement campaigns are typically distributed to multiple recipients at the same time. Accordingly, multiple users can engage a respective click-to-connect element at or near the same time as other users, thereby causing an influx in connection requests for a particular provider. A large number of near simultaneous connection requests can consume bandwidth and burden the underlying communication network. As such, connection requests may fail or be denied. Traditional methods of rejecting communication requests can result in a loss of interest in a click-to-connect campaign. Accordingly, shortcomings in conventional systems and methods are identified and addressed in this disclosure.

SUMMARY

It is to be understood that both the following general description and the following detailed description are exemplary and explanatory only and are not restrictive, as claimed. Provided are methods and systems for advertising. The system and methods of the present disclosure can be used to initiate communications between consumers and merchants (or merchant representatives). In an aspect, the rendering of two-way communication, such as click-to-connect advertisements to various users can be sequenced and/or randomized in order to manage the number of users to which the advertisements are rendered. As an example, advertisement rendering can be based on stochastic random sampling that is complimentary to voice over Internet protocol (VoIP) statistical models. As a further example, the user experience provided by the two-way communication can comprise user selectable elements, icons, banners, engageable elements overlaying an advertisement, and the like.

In an aspect, a method can comprise rendering content to a plurality of users. As an example, the content can have a time duration. In an aspect, a first selectable element associated with the content can be rendered to a first one of the plurality of users at a first time during the time duration of the rendered content. In an aspect, a second selectable element associated with the content can be rendered to a second one of the plurality of users at a second time during the time duration of the rendered content. As an example, the second time is different from the first time and the first selectable element is not rendered to the first one of the plurality of users while the second selectable element is rendered to the second one of the plurality of users.

In another aspect, a method can comprise rendering content to a plurality of users. As an example, the content can have a time duration. In an aspect, a first selectable element associated with the content can be rendered to a first one of the plurality of users at a first time during the time duration of the rendered content. In an aspect, a second selectable element associated with the content can be rendered to a second one of the plurality of users at a second time during the time duration of the rendered content. As an example, the second time is different from the first time and the first selectable element is not rendered to the first one of the plurality of users while the second selectable element is rendered to the second one of the plurality of users. In an aspect, a selection of the first selectable element can be received at a third time. As an example, a first communication session can be imitated in response to the selection of the first selectable element. In an aspect, a selection of the second selectable element can be received at a fourth time. As an example, a second communication session can be initiated in response to the selection of the second selectable element.

In an aspect, a method can comprise rendering content to a plurality of users, the content having a time duration, rendering a first selectable element associated with the content exclusively to a first portion of the plurality of users at a first time during the time duration of the rendered content, and rendering a second selectable element associated with the content exclusively to a second portion of the plurality of users at a second time during the time duration of the rendered content, wherein the second time is different from the first time.

In an aspect, a system can comprise a source of content and a processor in communication with the source of content. As an example, the processor can be configured to render the content to a plurality of users. In an aspect, the content can have a time duration. As a further example, the processor can be configured to render a first selectable element associated with the content to a first one of the plurality of users at a first time during the time duration of the rendered content. As a further example, the processor can be configured to render a second selectable element associated with the content to a second one of the plurality of users at a second time during the time duration of the rendered content, wherein the second time is different from the first time.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
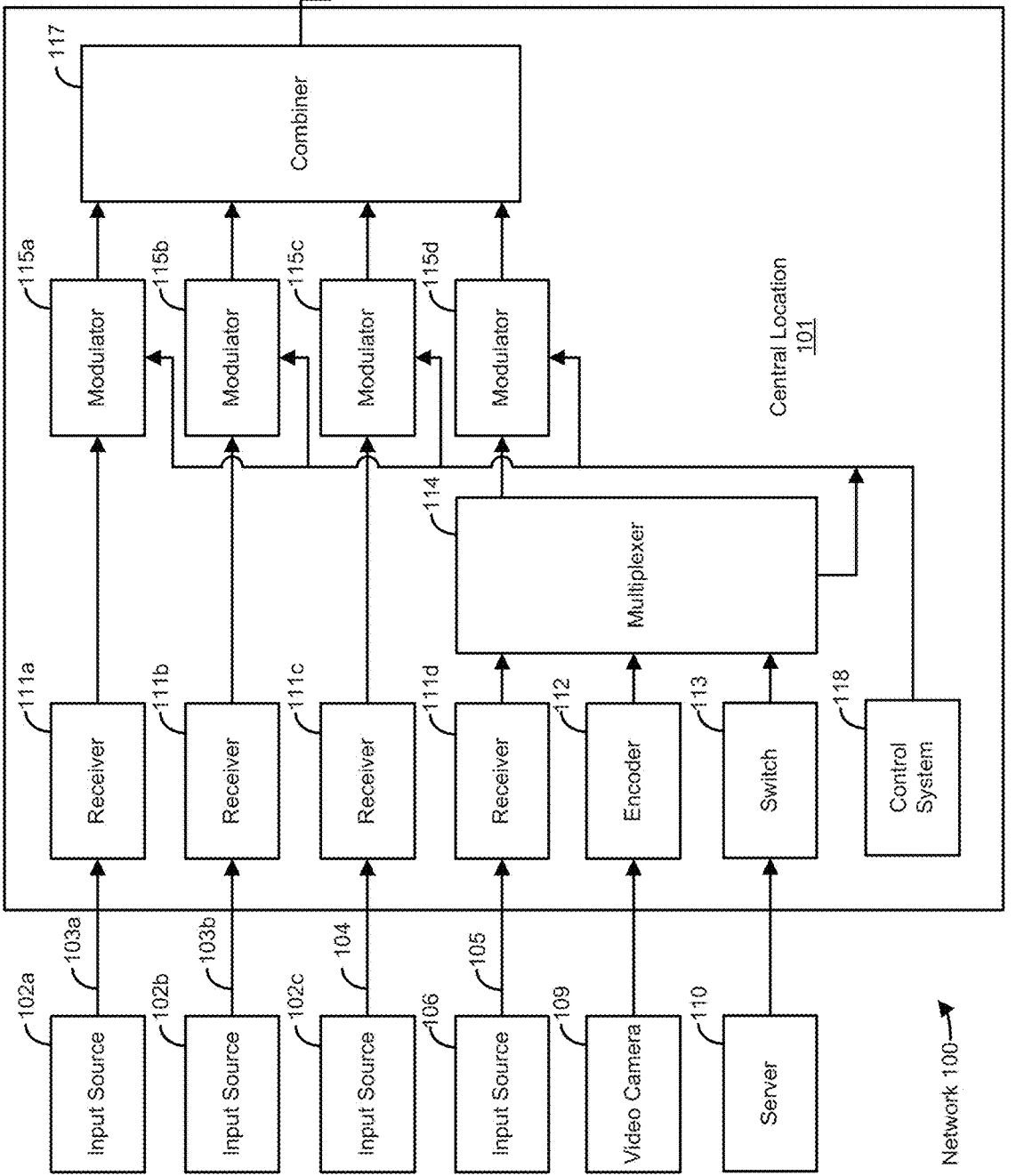
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system and network can be configured to control presentation of various types of content (e.g., advertisements, banners, click-to-connect icons) on a plurality of devices. In an aspect, interactive or selectable advertisements can be rendered to various users in a selective, random, seemingly random, and/or exclusive manner.

FIG. 1 illustrates various aspects of an exemplary network in which the present methods and systems can operate. The present disclosure relates to systems and methods for advertising. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, head-end, etc.) which can receive content (e.g., data, input programming, and the like) from multiple sources. The central location 101 can combine the content from the various sources and can distribute the content to user (e.g., subscriber) locations (e.g., location 119) via distribution system 116. In an aspect, content can comprise advertisements such as video commercials, audio, and/or images. As a further example, interactive advertisements can be processed at the central location 101 or other system or device.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or home communications terminal (CT) that can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as a network storage.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. As a further example, rendering content can comprise providing an advertisement to a device and overlaying an interactive element (e.g., click-to-connect) or user engageable element on the device. In an aspect, a user may engage an interactive element to acquire additional information relating to the content. As an example, a user may engage an interactive element to make a sale/purchase, subscribe to a service, make an inquiry, request additional details, request educational type info, or locate related information or articles. In an aspect, the interactive element can provide a means for initiating a communication session with a merchant, vendor, service provider, or representative relating to the underlying advertisement. However, other content can be rendered via the user device 124. In an aspect, once the interactive element (e.g., click-to-connect element) is engaged, a communication session between the user and a party associated with the interactive element (e.g., click-to-connect element) is initiated. For example, engaging the interactive element (e.g., click-to-connect element) can automatically dial a telephone number associated with a merchant or service provider (e.g., a party associated with the click-to-connect element). Accordingly, the party associated with the interactive element (e.g., click-to-connect element) can receive the telephone call and can have a conversation with the user. As a further example, the user engaging the interactive element can cause a chat window to appear and establish a text communication with a party. Other forms of communication can be used to facilitate the communication session.

As an illustrative example, a user can be watching a commercial relating to cars and a click-to-connect icon can appear on the user device 124. When the user engages the click-to-connect icon, the user device 124 can dial a car dealership associated with the commercial. Accordingly, a representative of the car dealership (e.g., call center, agent, employee, vendor, merchant, professional, service provider, customer service, etc.) can receive the call from the user device 124 and can have a conversation with the user via the user device 124.

In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment, such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium.

In an aspect, a merchant system 126 or device can be in selective communication (e.g., over a network, communications channel, VoIP, etc.) with one or more of the CT 120, the user device 124, and other devices, such as, for example, smart phones, computers, and VoIP-enabled devices. As an example, the merchant system 126 can be associated with one or more of a merchant of goods or services, a representative of a merchant, a vendor, a service provider, a manufacturer, a seller, and service professional. As a further example, the merchant system 126 can be in selective communication with one or more of the CT 120, the user device 124, and other devices, such as communication devices based upon a click-to-connect advertisement. In an aspect, a click-to-connect advertisement can be rendered to a particular user and/or user device and, when selected, a communications session between the particular user and/or user device and the merchant system 126 can be initiated and established. As an example, the merchant system 126 can comprise a call center, an order fulfillment center, a customer service center, a technical assistance center, an information helpline, etc.

As described in greater detail below, an advertisement system can control selectable and/or interactive content being rendered to various devices and can facilitate establishing a communication between remote devices. As an example, the advertisement system can control the communication between remote devices and one or more merchant systems.

Figure 2:
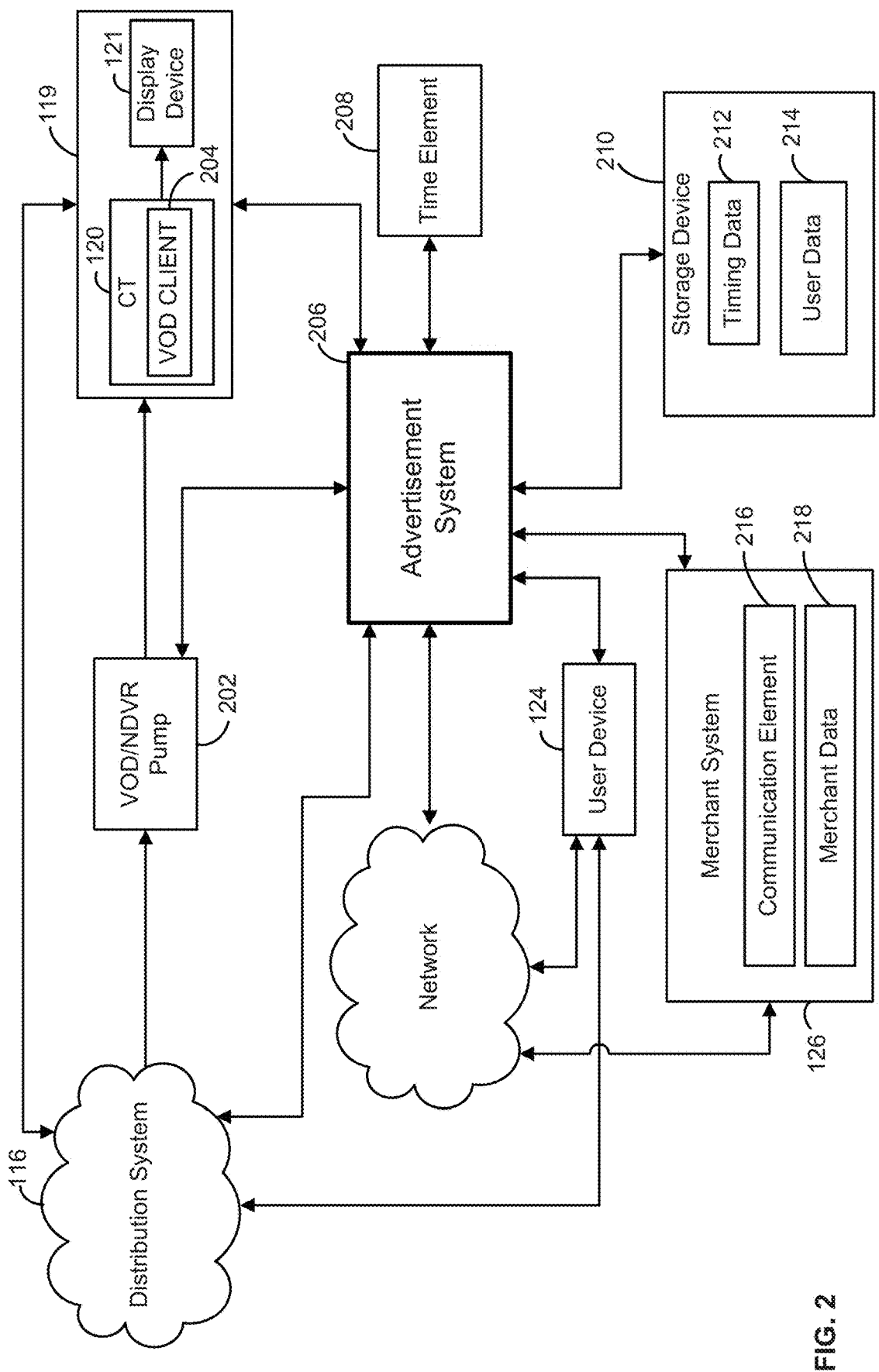
FIG. 2 is a block diagram on an exemplary network.

FIG. 2 illustrates various aspects of an exemplary system in which some of the disclosed methods and systems can operate. As an example, the distribution system 116 can communicate with the CT 120 or other content processing device at the user location 119, for example, via a linear transmission. As a further example, the distribution system 116 can transmit signals to a video on demand (VOD) system (such as VOD pump 202) or network digital video recorder pump for processing and delivery to the user location 119.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

In an aspect, the CT 120 can comprise a software component such as VOD client 204 to communicate with a VOD server (e.g., server 110). The VOD client 204 can communicate requests to the VOD server or a VOD management system in communication with the VOD server to configure the VOD pump 202 to transmit content to the CT 120 for displaying the content to a user. Other content distribution or access systems can be used to transmit content signals to the user location 119. The foregoing and following examples of video transmissions are also applicable to transmission of other data. As an example, content can be received and stored for subsequent playback.

In an aspect, the user device 124 can receive content from the distribution system 116, an Internet Protocol network such as the Internet, and/or a communications network such as a cellular network, for example. Other network and/or content sources can transmit content to the user device 124. As an example, the user device 124 can receive streaming or file-based data, audio and/or video for playback to the user. As a further example, the user device 124 can receive user experience (UX) elements such as widgets, applications, and selectable or interactive advertisements (e.g., click-to-connect) for display via a human-machine interface. In an aspect, user device 124 can be disposed inside or outside the user location 119. As an example, content can be received and stored for subsequent playback.

In an aspect, an advertisement system 206 can be in communication with the distribution system 116, the CT 120, the user device 124, the Internet or other network, and/or a communication network to receive information relating to connected device and/or content being delivered to a particular user or connected device. As an example, other communications elements such as software, virtual elements, computing devices, router devices, and the like, can comprise or serve as advertisement system 206. As a further example, the advertisement system 206 can process advertisements associated with content and/or programming to determine whether a particular advertisement should be presented (e.g., rendered, transmitted, or the like) to one or more devices, as described in further detail herein. In an aspect, the advertisement system 206 can be disposed remotely from the user location 119. However, the advertisement system 206 can be disposed anywhere, including at the user location 119 to reduce network latency, for example.

In an aspect, a time element 208 can be in communication with (or incorporated into) at least the advertisement system 206 to provide a timing reference thereto. As an example, the time element 208 can be a clock. As a further example, the time element 208 can transmit timing information to the advertisement system 206 for associating a time stamp with a particular event received by the advertisement system 206. In an aspect, the advertisement system 206 can cooperate with the time element 208 to associate a time stamp with events having an effect on the content delivered to the CT 120 and/or the user device 124 such as, for example, a channel tune, a remote tune, remote control events, playpoint audits, playback events, program events including a program start time and/or end time and/or a commercial/intermission time, and/or playlist timing events, and the like or other types of events.

In an aspect, a storage device 210 can be in communication with the advertisement system 206 to allow the advertisement system 206 to store and/or retrieve data to/from the storage device 210. As an example, the storage device 210 can store data relating to timing data 212 and/or user data 214 relating to devices such as the CT 120 and/or the user device 124. In an aspect, the timing data 212 can be a time stamp or other time marker for indicating, for example, a date and/or time associated with one or more of a transmission of content, a request for content, a request for playback, storage of content, deletion of content, a request for a communication session, and/or a rendering of an advertisement. As an example, the timing data 212 can comprise any number of time-related entries and/or markers. As a further example, the timing data 212 can comprise one or more of a table of time-related data entries, a timing log, and a database of time-related information. Other information can be stored as the timing data.

As an example, the user data 214 can comprise information relating to characteristics and parameters associated with a particular user and/or device and/or merchants. In an aspect, the user data 214 can comprise information relating to a location, historical usage or other characteristic of a particular device. As an example, the user data 214 can comprise information relating to a particular merchant or merchants such as services, products, location, number of representatives, preferred contact means, and/or advertisements. As a further example, the user data 214 can comprise information relating to user preferences and behaviors such as time of day, preferred programming, underlying advertisements or merchants to which a user has responded, and/or genres of content and advertisements. Other information relating to a particular user, location, and/or device can be comprised as the user data 214. In an aspect, the storage device 210 can store information relating to users, user preferences, and user devices and configuration.

In an aspect, the merchant system 126 can be in communication with one or more of the advertisement system 206, the CT 120, the user device 124, the network such as the Internet, and/or a communication network to send/receive information relating to one or more merchants (e.g., merchant data 216). In an aspect, the merchant data 216 can comprise information related to a particular entity such as a service provider or merchant such as services, products, location, number of representatives, preferred contact means, advertisement campaigns, and the like. As an example, the merchant system 126 can comprise a communication element 218 such as VoIP software and/or hardware for conducting a communication session with a connect device. As a further example, the communication element 218 can be configured to receive and/or grant requests received from devices for initiating a communication session. Once a request is granted, a communication session can be established between the requesting device and the merchant system 126 (e.g., the communication element 218), thereby facilitating a dialogue (e.g., conversation) or an exchange of messages between a user and a merchant or representative.

As described in greater detail below, an advertisement system can control selectable and/or interactive advertisements being rendered or presented to various devices and can facilitate establishing a communication between remote devices.

Figure 3:
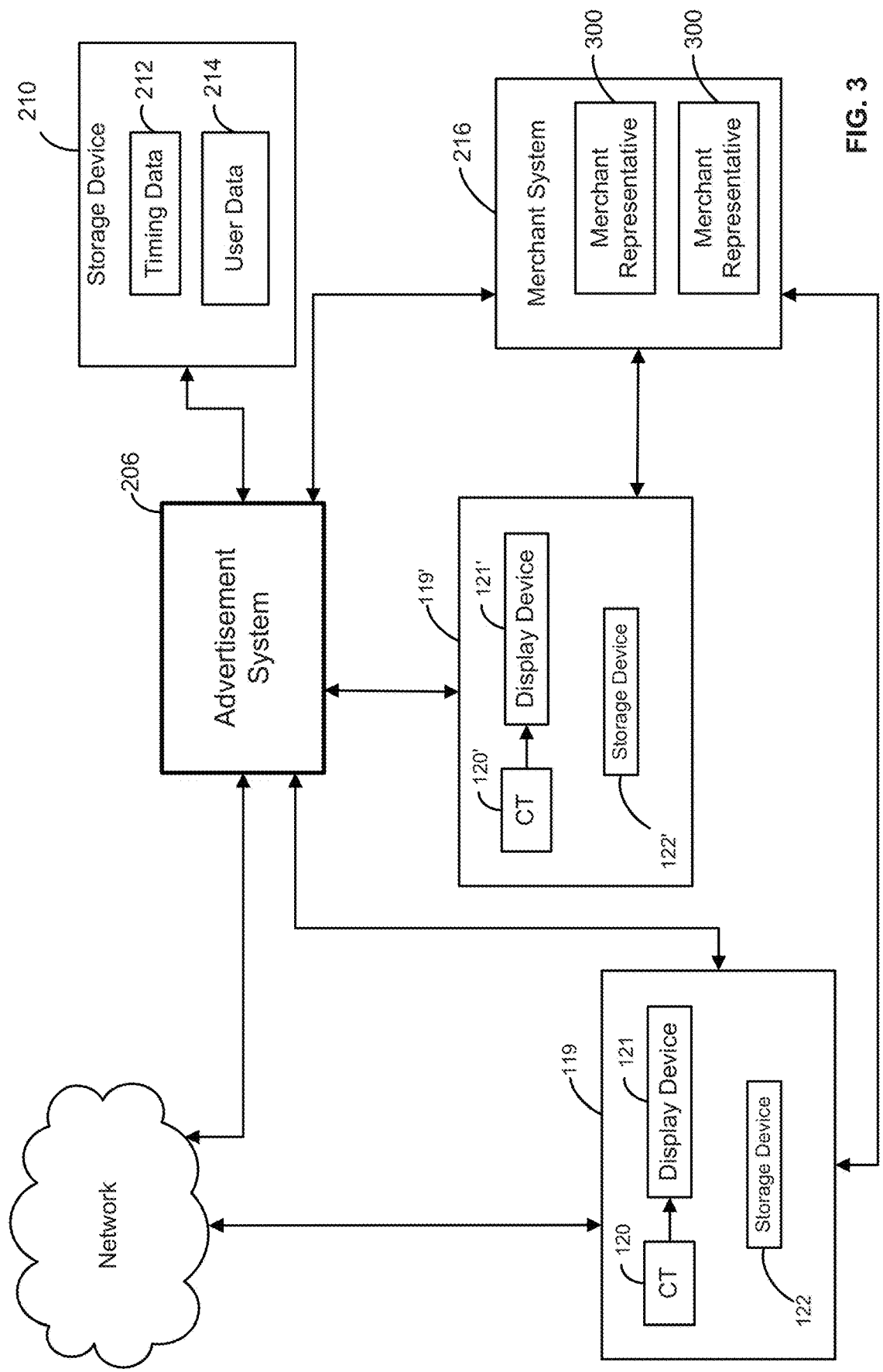
FIG. 3 is a block diagram on an exemplary network.

FIG. 3 illustrates various aspects of an exemplary system in which the present methods can operate. As an example, a network or distribution system can communicate with the CT 120 (or user device 124) at the user location 119 (or other location such as a remote or mobile location) via a linear or non-linear transmission. Any means of transmitting content to the CT 120 or user device can be used, such as broadcast, multicast, unicast, etc. As a further example, a network or distribution system can communicate with a second CT 120' (or second user device) at a second user location 119' (or other user location) via a linear or non-linear transmission. Any means of transmitting content to the second CT 120' or user device can be used, such as broadcast, multicast, unicast, etc.

In aspect, one or more merchant representatives 300, which can be any type of device or an agent, can be in communication with one or more of the advertisement system 206, the CT 120, the user device 124, the networks, and/or a communication network. As an example, the advertisement system 206 can render or present an advertisement to a particular device, whereby a user can interact with the advertisement to transmit a request for a communication session. Accordingly, the request can be routed to the appropriate merchant representative 300 and the merchant representative 300 can grant the request and establish a communication session with the requesting device. In an aspect, the advertisement system 206 can stagger or randomize the rendering of interactive advertisements to a subset of users or user devices (e.g., CT 120, 120', user device 124, 124') based upon the availability of one or more merchant representatives 300. As an example, user devices located in a particular region can receive an advertisement associated with a first one of the merchant representatives 300, while other devices in another region can receive an advertisement associated with a second one of the merchant representatives 300. In an aspect, content (e.g., advertisements, informational publications, entertainment programming, contests, etc.) can be rendered or presented to a plurality of users. As an example, the content can have a particular time duration. As a further example, a first selectable element associated with the content can be rendered or presented to a first one of the plurality of users during the time duration of the rendered content, wherein the first one of the plurality of users can be located in a first location (e.g., region, market, particular wireless access point(s), etc.) and the first selectable element can be associated with a first merchant (or merchant representative) servicing the first location. In an aspect, a second selectable element associated with the content can be rendered to a second one of the plurality of users during the time duration of the rendered content. As an example, the second one of the plurality of users can be located at a second location and the second selectable element can be associated with a second merchant (or merchant representative) servicing the second location. Any content and/or selectable elements can be rendered or presented to any number of users.

As described in greater detail below, a system and network can be configured to control presentation of various types of content (e.g., advertisements) on a plurality of devices. In an aspect, selectable elements (e.g., interactive advertisements) can be rendered to one or more devices.

Figure 4:
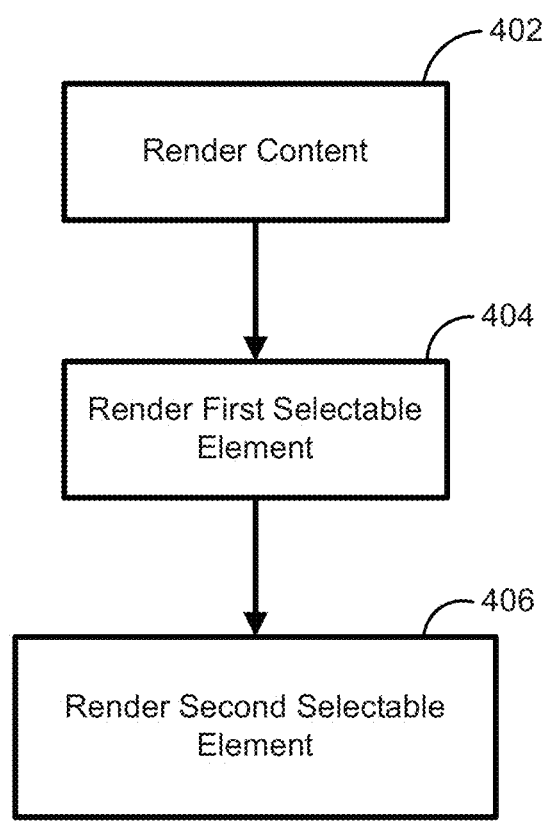
FIG. 4 is a flow chart of an exemplary method.

FIG. 4 illustrates a method for controlling content (e.g., advertisements) presented to a user. In an aspect, in step 402, content can be rendered or presented to one or more users or user devices. For example, content can be rendered to a device such as the user device 124 or other content device. Content can be time stamped based upon the date and/or time of an event such as delivery, generation, storing, manipulation, or other process or event relating to the content. As a further example, the content rendered can have a pre-defined time duration.

In step 404, a first selectable element (e.g., interactive advertisements, communication icon, click-to-connect icon, a content banner, a pop-up, an overlay) can be presented or rendered to a first user device. As an example, the first selectable element can be rendered at a first time during the time duration of the rendered content. In an aspect, the first selectable element can be rendered to a device based upon random sampling. As an example, a random sample or subset of a plurality of potential recipients can be determined, and the first selectable element can be rendered to the sample. As a further example, sampling models, such as those used for managing VoIP traffic, can be leveraged to determine a subset of potential recipients to which the first selectable element can be presented. In an aspect, the first selectable element can be rendered exclusively to one or more users or devices or a subset of a plurality of users or devices. As a further example, the first selectable element is related to the content being rendered. In an aspect, the first selectable element can be an advertisement that is contextually related to the content rendered. As an example, the first selectable element can be associated with a particular merchant system 126 or merchant representative 300, such as a merchant network device. In an aspect, when a user selects the first selectable element, a communication session can be established between the user device and the merchant associated with the first selectable element. As an example, the communication session can be established using VoIP, cellular, SMS, realtime chat, and the like or any other messaging protocol. Other communication means and protocols can be used.

In an aspect, in step 406, a second selectable element can be rendered to a second user device. As an example, the second selectable element can be rendered at a second time during the time duration of the rendered content. As a further example, the second time can be the same or different from the first time. In an aspect, the second selectable element can be rendered exclusively to one or more users or devices or a subset of a plurality of users or devices. As an example, when the second selectable element is rendered or presented exclusively to one or more device or users, the selectable element is not presented to non-members of the exclusive one or more devices or users. However, other presentation techniques and patterns can be used. In an aspect, the first selectable element is not rendered to the first user device while the second selectable element is rendered to the second user device. The second selectable element can be related to the content being rendered. The first selectable element can be an advertisement that is contextually related to the content rendered. As an example, the second selectable element can be associated with a particular merchant system 126 or merchant representative 300. As a further example, the first selectable element can be associated with a first merchant (e.g., merchant system 126 or merchant representative 300) and the second selectable element can associated with a second merchant (e.g., merchant system 126 or merchant representative 300). In an aspect, when a user selects the second selectable element, a communication session can be established between the user device and the merchant associated with second selectable element. As an example, the communication session can be established using VoIP, cellular, SMS, realtime chat, and the like. However, other communication means and protocols can be used.

FIGS. 5A-5E illustrate example methods for controlling media presented to a user. In an aspect, in step 502 of FIG. 5A, content 503 can be rendered or presented to one or more users or user devices. In an aspect, content 503 can be rendered to a device such as the user device 124 or other content device, such as a fixed or mobile content delivery terminal, end-point device, display device, etc. As an example, content 503 can be time stamped based upon the date and/or time of storing, delivering or otherwise processing the content. As a further example, the content 503, when rendered, can have a pre-defined time duration.

Figure 5A:
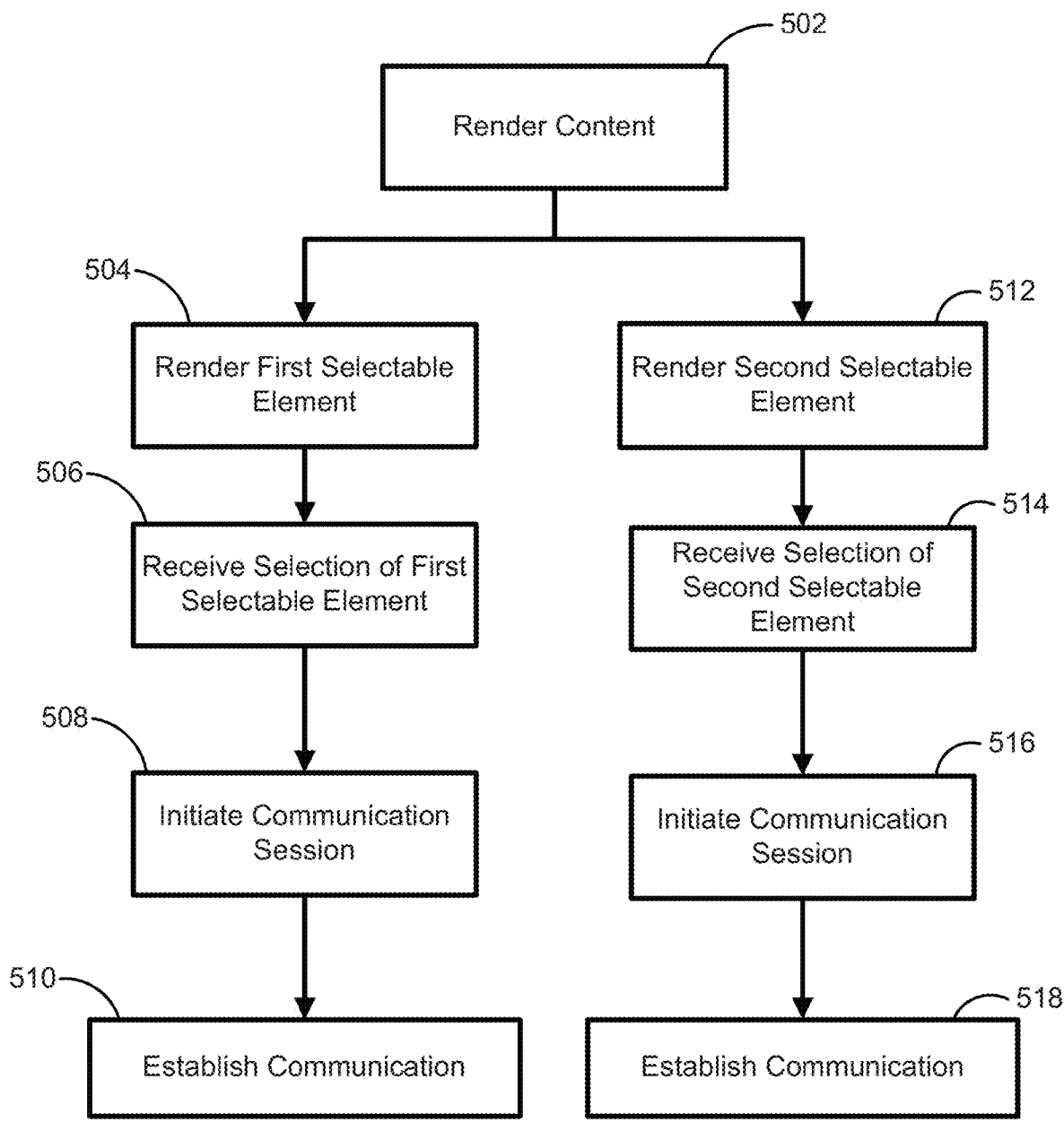
FIG. 5A is a flow chart of an exemplary method.
Figure 5B:
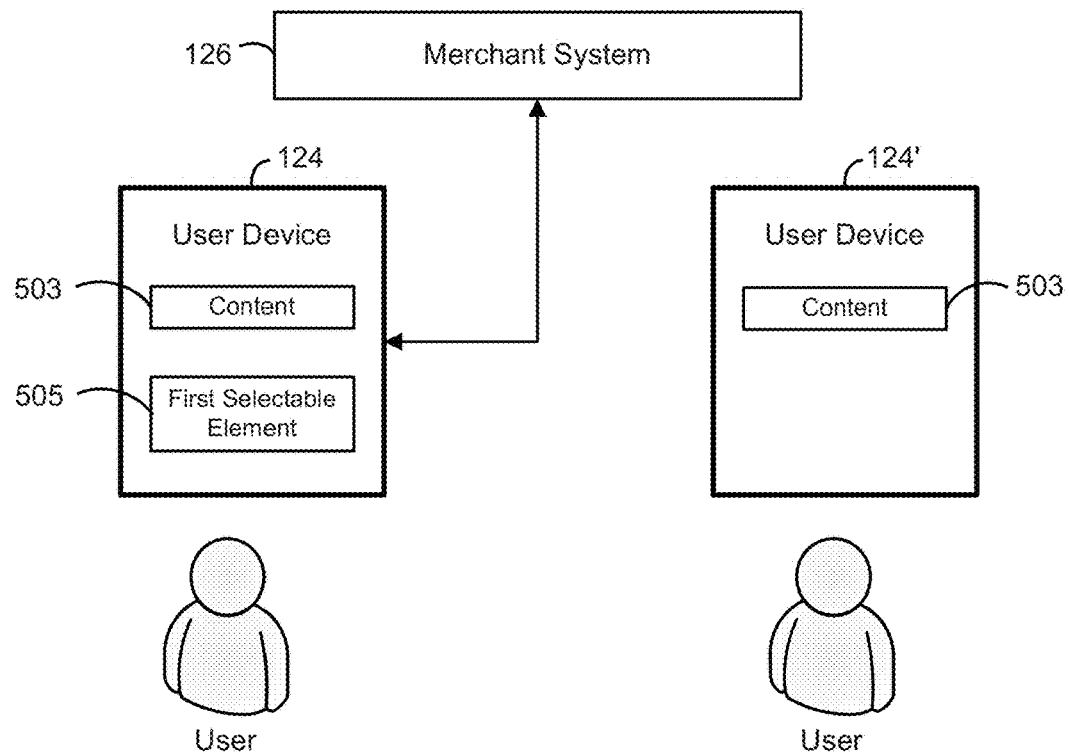
FIG. 5B is a block diagram of an exemplary communication session.

In an aspect, in step 504, a first selectable element 505 (e.g., interactive advertisements, a click-to-connect icon, a content banner, a pop-up, an overlay) can be rendered to a first user device, as shown in FIG. 5B. As an example, the first selectable element 505 can be rendered at a first time during the time duration of the rendered content 503. The first selectable element 505 can be related to the content 503 being rendered. In an aspect, the first selectable element 505 can be an advertisement that is contextually related to the content 503 rendered. As an example, the content 503 can be an advertisement or presentation of a vehicle and the first selectable element 505 can be a banner associated with a local car dealership. As a further example, the content 503 can be a movie showing a particular location and the first selectable element 505 can be a pop-up associated with a travel agency. As yet a further example, the content 503 can be a particular song and the first selectable element can be an overlaid audio message associated with a particular music provider (e.g., whereby a user can respond to the audio message by engaging a particular button of the audio device or providing a voice response). The first selectable element 505 can be associated with a particular merchant system 126 or merchant representative 300.

In an aspect, in step 506, a selection of the first selectable element 505 is received. As an example, a user can interface with the device rendering the first selectable element 505 to make the selection, which can be done via any desired input or messaging technique. In response to the selection of the first selectable element 505, a communication session can be initiated, at step 508. The communication session can be initiated by transmitting a communication request to a recipient for processing the request and establishing a communication session, at step 510. In an aspect, when a user selects the first selectable element 505, a communication session can be established between the user device and the party (e.g., merchant, agent, representative, associated device, etc.) associated with first selectable element 505. As an example, the communication session can be established using VoIP, cellular, SMS, realtime chat, and the like. However, other communication means and protocols can be used.

Figure 5C:
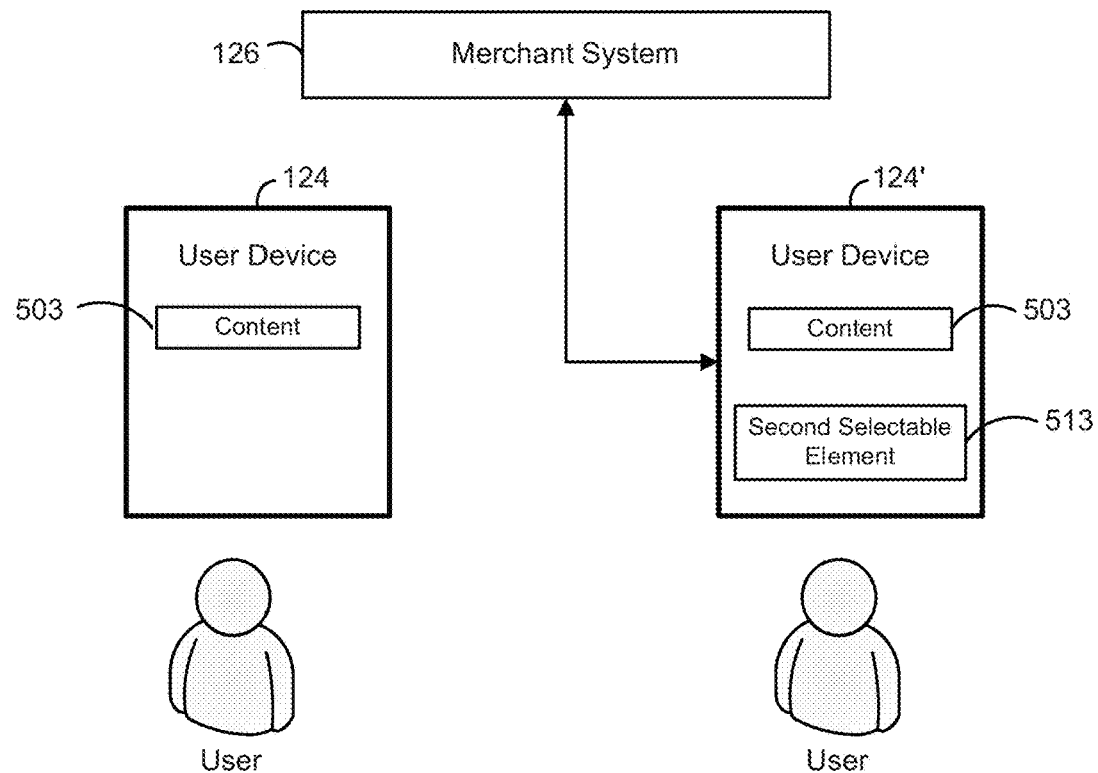
FIG. 5C is a block diagram of an exemplary communication session.

In an aspect, in step 512, a second selectable element 513 can be rendered or presented to a second user and/or user device 124', as shown in FIG. 5C. As an example, the second selectable element 513 can be rendered at a second time during the time duration of the rendered content 503. In an aspect, the second selectable element 513 can be rendered exclusively to one or more users or devices or a subset of a plurality of users or devices. As a further example, the second time can be different from the first time. In an aspect, the first selectable element 505 is not rendered to the first user device while the second selectable element 513 is rendered to the second user device. In an aspect, the second selectable element 513 can be related to the content 503 being rendered. In an aspect, the second selectable element 513 can be an advertisement that is contextually related to the content 503 rendered. As an example, the second selectable element 513 can be associated with a particular merchant system 126 or merchant representative 300 or device. As a further example, the first selectable element 505 can be associated with a first merchant (e.g., merchant system 126 or merchant representative 300) and the second selectable element 513 can be associated with a second merchant (e.g., merchant system 126 or merchant representative 300). Any selectable element can be associated with the same or different representatives, agents, or users.

In an aspect, in step 514, a selection of the second selectable element 513 is received. As an example, a user can interface with the device rendering the second selectable element 513 to make the selection. In response to the selection of the second selectable element 513, a communication session can be initiated, at step 516. As an example, the communication session can be initiated by transmitting a communication request to a recipient for processing the request and establishing a communication session, at step 518. In an aspect, when a user selects the second selectable element 513, a communication session can be established between the user device and the merchant associated with the second selectable element, which can be the same merchant or device associated with the first selectable element. As an example, the communication session can be established using VoIP, cellular, SMS, realtime chat, and the like. However, other communication means and protocols can be used.

A plurality of different users/devices may request a communication with a particular merchant, agent, or representative in response to an advertisement distributed to a plurality of users at the same time. Accordingly, a processing load for network communication channels and systems processing the communications can be large at particular times. However, since the advertisement system 206 of the present disclosure can control the rendering of advertisements using sequencing, staggering, or randomization techniques, the processing load can be minimized. For example, the advertisement system 206 can stagger the rendering of a particular interactive advertisement (e.g., associated with a particular merchant or merchant representative) to a number of users or user devices (e.g., a sub-group of a larger target group). In this way, only a select number of users can interact with the advertisement to request a communication session. The advertisement system 206 can render an advertisement associated with a different merchant to another user or subset of users.

Figure 5D:
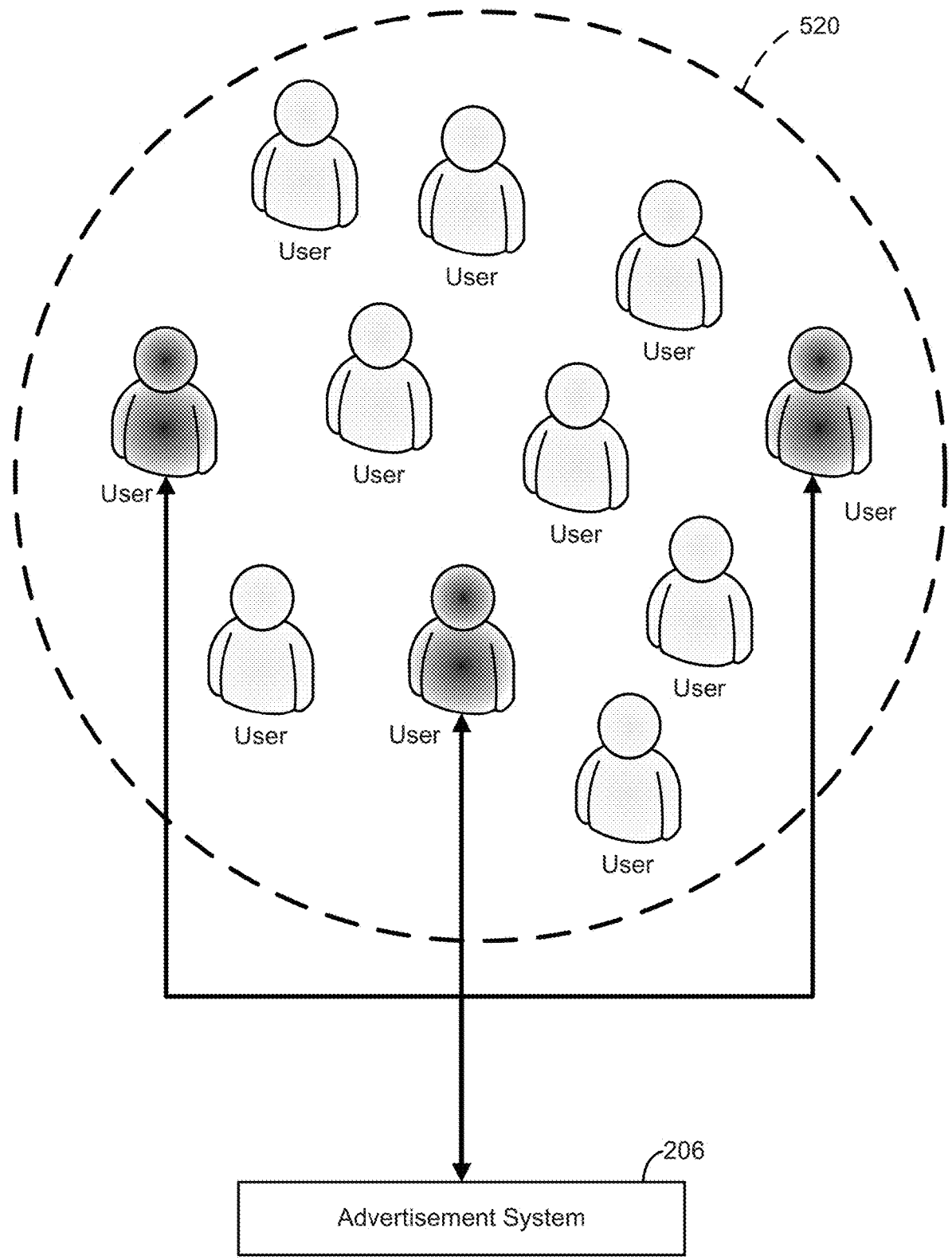
FIG. 5D is a block diagram of an exemplary communication session.

In FIG. 5D, for example only, a target group 520 (e.g., comprising users, devices, addresses, identifiers, etc.) can be defined. As an example, a particular service provider can define the target group 520 based upon devices connected to an access point associated with services provided to that location. As a further example, an advertiser can define the target group 520 based upon interest or location of users that are determined to have an interest in a particular advertisement. In an aspect, the target group 520 can be defined by region, wireless access point, market, user profile parameter, and/or a common classifier. As an example, the advertisement system 206 can define the target group based upon any number of metrics, classifiers, or parameters. As a further example, the advertisement system 206 can select a subset of the target group 520 to which a particular content (e.g., advertisement) can be transmitted. In an aspect, the transmission of content to the subset of the target group 520 can be sequenced and/or randomized in order to manage the number of users to which the content can be rendered. As an example, advertisement rendering can be based on simple sampling of the target group 520, weighted sampling, stochastic random sampling and/or sampling techniques similar to voice over Internet protocol (VoIP) statistical models. As an example, a plurality of subsets can be defined. In an aspect, content can be rendered to a first one of the subsets at a first time and a second one of the subsets at a second time.

Figure 5E:
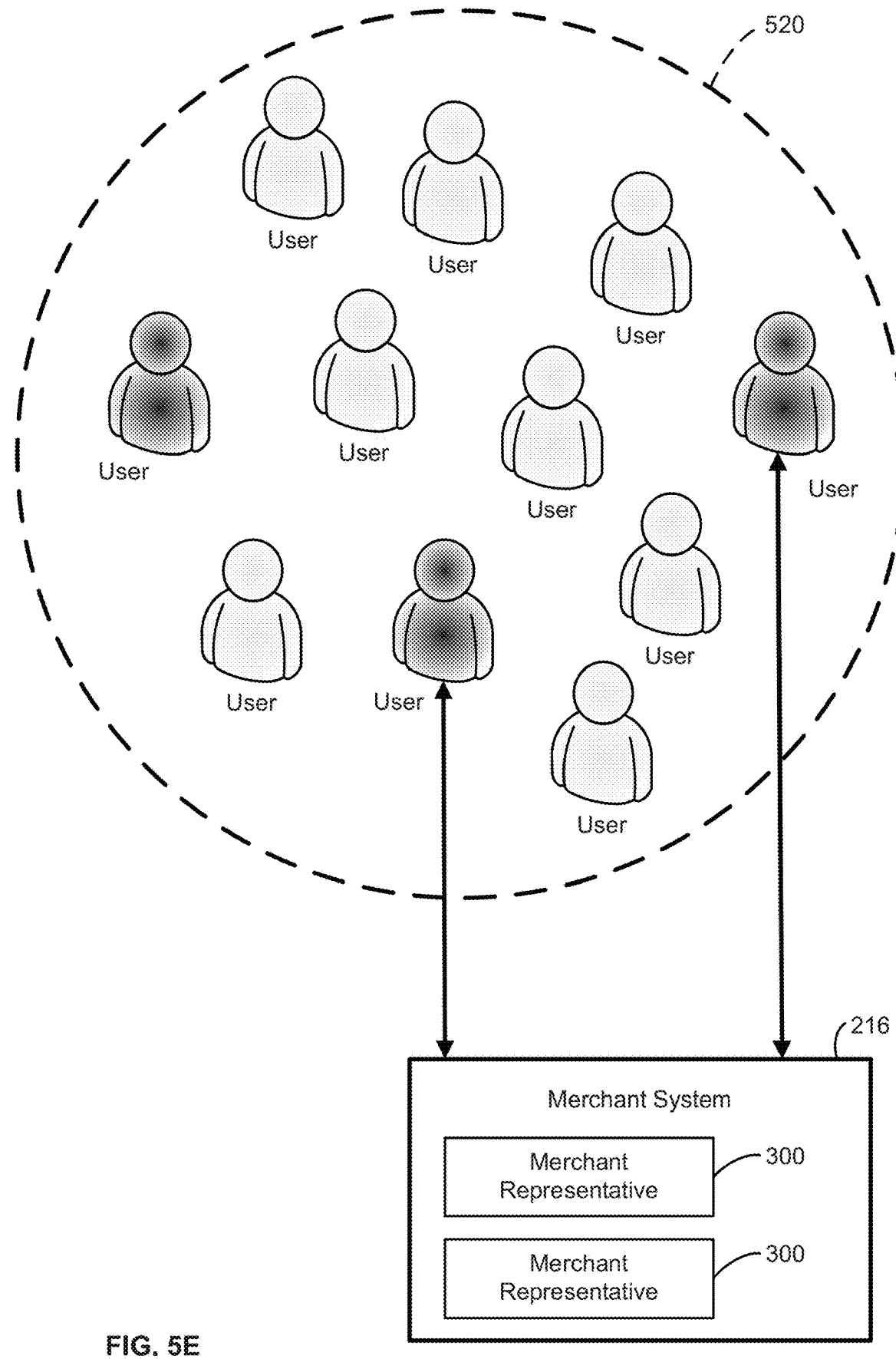
FIG. 5E is a block diagram of an exemplary communication session.

In FIG. 5E, for example only, one or more of the subset of the target group 520 can initiate and/or establish a communication session by interacting with the content (e.g., advertisement, click-to-connect icon, etc.) or responding to the content presented to the subset. Since the subset can be the only members of the target group 520 that receive the advertisement or content to enable a communication session, only the select number of users can interact with the advertisement to request a communication session. As an example, one or more of the subset of the target group 520 can establish a communication session with a merchant representative 300 or agent of a service provider (e.g., merchant system 216). As a further example, the number of members of the target group can be adjusted based upon the capacity of the service provider, the network, or other parameter. As a further example, the number of members of the subset can be adjusted, thereby providing discrete management of the number of communication sessions that can be established.

Figure 6:
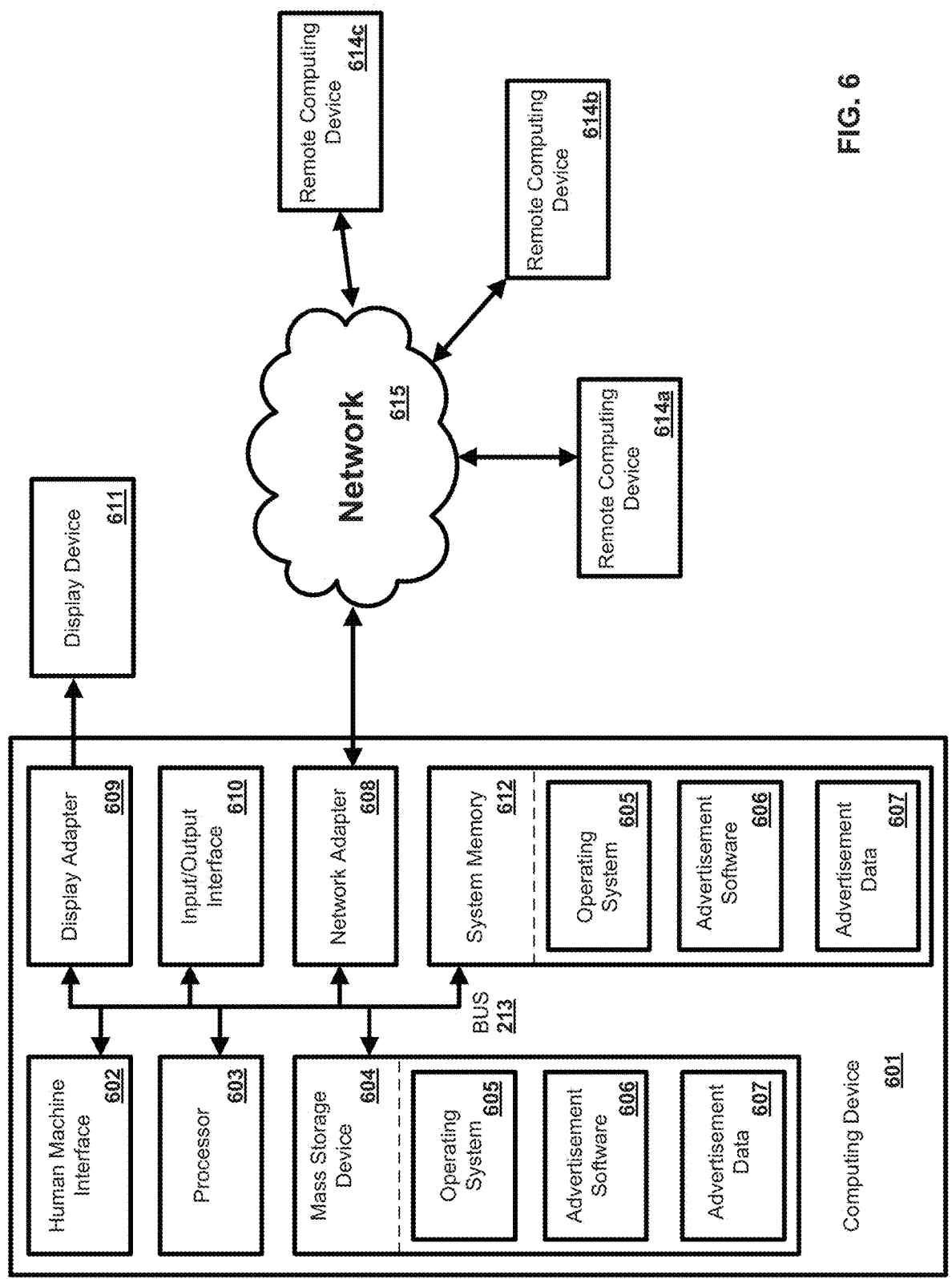
FIG. 6 is a block diagram of an exemplary computing device.

In an exemplary aspect, the methods and systems can be implemented on a computing system such as computing device 601 as illustrated in FIG. 6 and described below. By way of example, advertisement system 206 of FIG. 2 can be a computing device as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, advertisement software 606, advertisement data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as advertisement data 607 and/or program modules such as operating system 605 and advertisement software 606 that are immediately accessible to and/or are presently operated on by the processing unit 603.

In another aspect, the computing 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and advertisement software 606. Each of the operating system 605 and advertisement software 606 (or some combination thereof) can comprise elements of the programming and the entitlement software 606. Advertisement data 607 can also be stored on the mass storage device 604. Advertisement data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614a,b,c. By way of example, a remote computing device can be a personal computer, portable computer, a smartphone, a server, a router, a network computer, a peer device or other common network node, and so on. Logical connections between the computing device 601 and a remote computing device 614a,b,c can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of advertisement software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The system and methods of the present disclosure can be used to initiate two-way communications between consumers and merchants (or merchant representatives). In an aspect, the rendering of user selectable elements (e.g., click to connect elements, advertisements, icons, banners, engageable elements overlaying an advertisement) to various users can be sequenced and/or randomized in order to manage the number of users to which the advertisements are rendered. As an example, advertisement rendering can be based on stochastic random sampling that is complimentary to the voice over Internet protocol (VoIP) statistical model.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining a target group of devices;
   determining a first subset and a second subset of the target group of devices, wherein each of the first subset and the second subset comprises a respective plurality of devices, wherein a quantity of devices in the first subset or the second subset is based on a session capacity of a merchant system;
   sending, at a first time, an interactive advertisement exclusively to the first subset;
   sending, at a second time, the interactive advertisement exclusively to the second subset, wherein the first time is different from the second time, wherein the first time and the second time are determined randomly;
   receiving, from a first device of the first subset, a first interaction with the interactive advertisement;
   initiating a first communication session between the first device and the merchant system in response to the first interaction;
   receiving, from a second device of the second subset, a second interaction with the interactive advertisement; and
   initiating a second communication session between the second device and the merchant system in response to the second interaction.

2. The method of claim 1, wherein the interactive advertisement comprises a pop-up advertisement.

3. The method of claim 1, wherein the first interaction comprises a first request, and wherein the first communication session is initiated in response to the first request.

4. The method of claim 3, wherein the second interaction comprises a second request, and wherein the second communication session is initiated in response to the second request.

5. The method of claim 4, wherein one or more of the first communication session or the second communication session comprises a two-way communication session initiated over an internet protocol communication path.

6. The method of claim 4, wherein one or more of the first communication session or the second communication session comprises a Short Message Service (SMS) message.

7. The method of claim 1, wherein the first subset is associated with a first geographical region, and wherein the second subset is associated with a second geographical region.

8. The method of claim 1, wherein the first communication session is initiated between the first device and the merchant system via an agent of the merchant system.

9. The method of claim 1, wherein the second communication session is initiated between the second device and the merchant system via an agent of the merchant system.

10. The method of claim 1, wherein the quantity of devices in the first subset or the second subset is updated based on a network capacity.

11. An apparatus-comprising:
    one or more processors; and
    a memory comprising processor executable instructions that, when executed by the one or more processors, cause the apparatus to:
    determine a target group of devices;
    determine a first subset and a second subset of the target group of devices, wherein each of the first subset and the second subset comprises a respective plurality of devices, wherein a quantity of devices in the first subset or the second subset is based on a session capacity of a merchant system;
    send, at a first time, an interactive advertisement exclusively to the first subset of the target group of devices;
    send, at a second time, the interactive advertisement exclusively to the second subset of the target group of devices, wherein the first time is different from the second time, wherein the first time and the second time are determined randomly;
    receive, from a first device of the first subset, a first interaction with the interactive advertisement;
    initiate a first communication session between the first device and the merchant system in response to the first interaction;

receive, from a second device of the second subset, a second interaction with the interactive advertisement; and initiate a second communication session between the second device and the merchant system in response to the second interaction.

12. The apparatus of claim 11, wherein the interactive advertisement comprises a pop-up advertisement.

13. The apparatus of claim 11, wherein the first interaction comprises a first request, and wherein the first communication session is initiated in response to the first request.

14. The apparatus of claim 11, wherein the second interaction comprises a second request, and wherein the second communication session is initiated in response to the second request.

15. The apparatus of claim 11, wherein one or more of the first communication session and the second communication session comprises a two-way communication session initiated over an internet protocol communication path.

16. The apparatus of claim 11, wherein one or more of the first communication session and the second communication session comprises Short Message Service (SMS).

17. The apparatus of claim 11, wherein the first subset is associated with a first geographical region, and wherein the second subset is associated with a second geographical region.

18. The apparatus of claim 11, wherein the first communication session is initiated between the first device and the merchant system via an agent of the merchant system.

19. The apparatus of claim 11, wherein the second communication session is initiated between the second device and the merchant system via an agent of the merchant system.

20. One or more non-transitory computer-readable media storing processor executable instructions that, when executed by at least one computing device, cause the at least one computing device to:

determine a target group of devices;

determine a first subset and a second subset of the target group of devices, wherein each of the first subset and the second subset comprises a respective plurality of devices, wherein a quantity of devices in the first subset or the second subset is based on a session capacity of a merchant system;

send, at a first time, an interactive advertisement exclusively to the first subset of the target group of devices;

send, at a second time, the interactive advertisement exclusively to the second subset of the target group of devices, wherein the first time is different from the second time, wherein the first time and the second time are determined randomly;

receive, from a first device of the first subset, a first interaction with the interactive advertisement;

initiate a first communication session between the first device and the merchant system in response to the first interaction;

receive, from a second device of the second subset, a second interaction with the interactive advertisement; and initiate a second communication session between the second device and the merchant system in response to the second interaction.

* * * * *